Patented Jan. 16, 1951

2,538,168

UNITED STATES PATENT OFFICE 2,538,168

PRODUCTION OF AROMATIC ACYL-ACETO-ACETIC ANILIDES

Max Schmid, Riehen, Switzerland, assignor to Ciba Limited, Basel, Switzerland, a Swiss firm No Drawing. Application July 29, 1947, Serial No. 764,561. In Switzerland July 30, 1946

6 Claims. (Cl. 260—558)

According to this invention acyl derivatives of amides of acetic acid are obtained in a smoothly occurring reaction by reacting 2 mols of an alkali metal compound of an amide of acetoacetic acid of the general formula

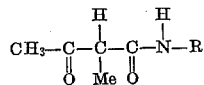

in which Me represents an atom of an alkali metal, and

represents the residue of a diazotisable amine, with 1 mol of an acylating agent, and then separating from one another the constituents of the resulting mixture by utilising their different solubilities, and, if desired, liberating the free acetoacetic acid amide derivative from the resulting metal compound of the general formula

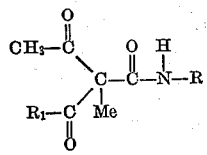

in which Me and

have the meanings given above, and the atomic grouping R₁—CO— corresponds to the residue of the acylating agent used.

The process may be carried out, for example, in a solvent immiscible with water, such as benzene or chlorobenzene. In this case, for example, the amide of acetoacetic acid may be introduced into the solvent; it is then converted into its alkali metal compound, and subsequently treated with the acylating agent, especially an acid chloride or anhydride. In the reaction which then occurs one half of the alkali metal compound is acylated with the regeneration of the free acetoacetic acid amide, which then goes into solution, while the diacyl-compound separates in the form of its alkali metal salt. After removing the latter by filtration about one half of the amide used can be recovered from the filtrate, and the residue is worked up to obtain the new diacyl-acetic acid amide. This may be carried out, for example, by dissolving the crude product in water, and liberating the new free diacyl-compound from the solution by the addition of an acid.

A similar reaction occurs when the process is carried out in an aqueous medium, but with the difference that, after the acylation, one half of the unchanged starting material is separated from the reaction mixture in the form of the free amide, while the alkali metal salt of the diacyl-compound is present in the aqueous solution. The whole is filtered, and the new diacyl-compound is obtained from the solution by acidification. By working in an aqueous medium it is possible in many cases to add to the reaction mixture, which contains besides the alkali metal salt of the diacyl-compound formed a portion of the acetoacetic acid amide used as starting material, a corresponding further quantity of alkali metal hydroxide and acylating agent, and so to advance the reaction one stage without preliminary separation of the starting material or the final product.

The new process is of quite general application. Thus, it can be carried out with amides which are obtainable from acetoacetic acid ester and diazotisable primary mono- or di-amines. Such diazotisable bases are generally of a cyclic nature and may belong to the aromatic or heterocyclic series. Amines of this kind are, among others, 1-aminobenzene, 1-amino-2-methylbenzene, 1-amino-2- or -3- or -4-chlorobenzene, 1-amino-2-methoxy-benzene, 1-amino-2 - ethoxybenzene, 1 - amino - 4 - methoxy- or -ethoxybenzene, 1-amino-2:5-dimethoxy- or -diethoxy-benzene, 1-amino-2:4-dimethoxy-5-chlorobenzene, 1-amino-3-methylbenzene, 1-amino-2-methoxy- or -ethoxy-5-methylbenzene, 4:4'-diaminodiphenyl, 4:4'-diamino-3:3'-dimethyldiphenyl, dehydrothiotoluidine, 2-aminothiazole, 2-aminobenzthiazole, 2-amino-6-methoxybenzthiazole, etc.

With regard to the acylating agents there are advantageously used those which introduce an acyl residue containing more than 2 carbon atoms, for example, chlorides of higher fatty acids such, for example, as propionic, lauric or stearic acid chloride, or chlorides of aromatic or araliphatic carboxylic acids such as benzene-1-carboxylic acid, 2- or 3- or 4-chlorobenzene-1-carboxylic acid, 2- or 3- or 4-methoxy- or -ethoxybenzene-1-carboxylic acid, 3- or 4-nitrobenzene-1-carboxylic acid, 2-methyl-benzene-1-carboxylic acid, cinnamic acid, naphthalene-1- or -2-carboxylic acid, diphenyl-4:4'-dicarboxylic acid, phthalic acids especially terephthalic acid, phenylacetic acid, phenoxyacetic acid and the like.

The new process also has the advantage of great simplicity, and it leads to very good yields of products which are themselves valuable intermediates for the dyestuff industry.

The new process is therefore surprising because it could not be foreseen that under the prescribed reaction conditions monoacylation at the carbon atom would proceed practically without the formation of noteworthy quantities of by-products.

The manner chosen above for representing compounds by reference to the general formulae

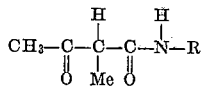

and

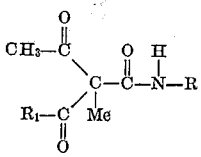

is naturally not intended to imply that the compounds in question must necessarily be present in the exact form represented and may not occur in another tautomeric form, for example,

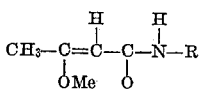

or

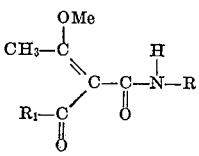

or

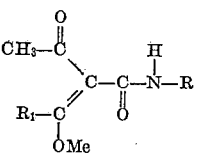

The following examples illustrate the invention, the parts being by weight unless otherwise stated, and the relationship of parts by weight to parts by volume being the same as that of the kilogram to the litre:

Example 1

211.5 parts of acetoacetic acid ortho-chloranilide (1 mol) are dissolved in 800 parts of water and 105 parts by volume of a caustic soda solution of 36° Bé. (1 mol+5 per cent.) at about 40–50° C., the solution, if desired after filtration, is cooled to about 0–5° C. by external cooling, and 73.5 parts of benzoyl chloride (½ mol+5 per cent.) are slowly added while stirring energetically.

The odour of benzoyl chloride disappears in about 6 hours with the formation of the sodium compound of benzoyl-acetoacetic acid ortho-chloranilide and the regeneration of acetoacetic acid ortho-chloranilide, which precipitates.

The whole is filtered with suction, and the filter residue is washed with cold water. The filtrate is treated with 70 parts by volume of hydrochloric acid of 30 per cent. strength, whereby benzoyl-acetoacetic acid ortho-chloranilide of the formula

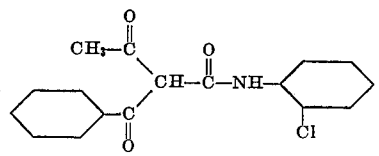

is precipitated.

Example 2

211.5 parts of acetoacetic acid ortho-chlor-anilide are dissolved in 700 parts of dry chlorobenzene with heat in a round flask fitted with stirring mechanism, a thermometer, a charging connection and a condenser and placed in an oil-bath, and about 100 parts of chlorobenzene are distilled off in order to complete the drying. The whole is then allowed to cool to about 100° C., and a solution, prepared by taking up 23 parts of sodium in 400 parts by volume of absolute alcohol, is slowly added. By heating, while stirring, the reaction mass is freed as far as possible from alcohol. This will be the case when the internal temperature has reached the boiling point of chlorobenzene, that is 130° C. A thick white suspension of the sodium compound of acetoacetic acid ortho-chloranilide is obtained. If desired, the reaction mixture may be diluted somewhat by the addition of chlorobenzene. The whole is then cooled to about 10° C., and a mixture of 71 parts of benzoyl chloride and about 140 parts of ortho-chlorobenzene are slowly introduced dropwise. The whole is stirred while cooling, and is subsequently further stirred at room temperature for about 24 hours. A pale yellow precipitate, consisting of the sodium compound of benzoyl-acetoacetic acid ortho-chloranilide, is formed. The whole is filtered with suction. The filtrate, which contains one half of the anilide in solution, may be used in a succeeding reaction mixture. The filter residue is dissolved in water, and subjected to steam distillation to remove chlorobenzene. Benzoyl-acetoacetic acid ortho-chloranilide can be obtained from the solution by acidification.

Example 3

211.5 parts of acetoacetic acid ortho-chloranilide are dissolved in 500 parts of water and 140 parts of a caustic soda solution of 30 per cent. strength. A solution of 51 parts of terephthaloyl chloride in 70 parts of acetone is added to the clear solution in the course of 10 minutes while thoroughly stirring and cooling with ice-water to 10–15° C. The whole is stirred for a further 4 hours, then a further 70 parts of caustic soda solution of 30 per cent strength and a solution of 26 parts of terephthaloyl chloride in 35 parts of acetone are poured in, and the whole is stirred over night at room temperature. The whole is then filtered, and the residue is washed with water and purified by dissolution in dilute caustic solution and precipitation with hydrochloric acid. 53 parts of regenerated acetoacetic acid ortho-chloranilide melting at 104° C. are obtained.

The clear caustic alkaline solution is poured into a mixture of 135 parts of hydrochloric acid of 30 per cent. strength and 200 parts of ice, stirred for a short time, and filtered to remove the granular precipitate. The latter is washed with water and dried at 70° C. 157 parts of terephthaloylbis-(acetoacetic acid ortho-chloranilide) of the formula

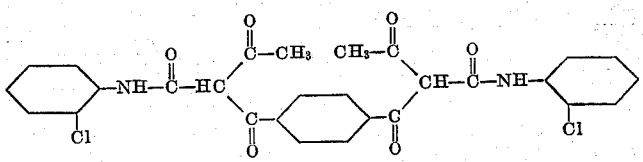

are obtained.

The procedure is similar in the case of the other amides and acylating agents named in the opening part of this specification.

*Example 4*

211.5 parts of acetoacetic acid ortho-chloranilide are dissolved at 40° C. in 1000 parts of water with the aid of 105 parts by volume of caustic soda solution of 36° Bé. (1 mol+5 per cent.), and the solution is filtered to remove impurities and cooled to 0-5° C. 88 parts of para-chlorobenzoyl chloride are poured in, while thoroughly stirring, in the course of 30 minutes. The whole is stirred for 2-3 hours at 5° C., 52 parts by volume of caustic soda solution are then added, a further 44 parts of para-chlorobenzoyl chloride are introduced in the course of 30 minutes, and the whole is stirred for 2 hours. These operations are repeated with one half of the quantities of caustic soda solution and chloride, until a total of about 176 parts of para-chlorobenzoyl chloride have been used. The whole is then stirred for a further 12 hours while cooling to 5° C., and the solution is then filtered to remove a small quantity of residue. The clear solution is mixed with 150 parts by volume of concentrated hydrochloric acid, whereupon the condensation product is precipitated in the form of a white precipitate, which solidifies in crystalline form after a short time. The whole is stirred for about one hour longer at room temperature, filtered, and the filter residue is washed with water. After drying under reduced pressure, the condensation product of the formula

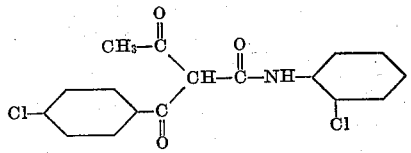

is obtained in a yield of 290-300 parts in the form of a white crystalline powder.

By replacing the para-chlorobenzoyl chloride in this example by 209.5 parts of 2:5-dichlorobenzoyl chloride there are obtained about 300 parts of 2:5-dichloro-benzoyl-acetoacetic acid ortho-chloranilide.

*Example 5*

211.5 parts of acetoacetic acid ortho-chloranilide are dissolved in 1000 parts of water with the aid of 105 parts by volume of a caustic soda solution of 36° Bé. and the filtered solution is cooled to 0-5° C. One half of a solution of 185.5 parts of para-nitrobenzoyl-chloride in 200 parts of dioxane are run in from a graduated dropping funnel while thoroughly stirring. The whole is stirred for 3 hours at 0-5° C., 55 parts by volume of caustic soda solution are then added, and the remaining half of the chloride solution is run in. These operations are repeated about 3 times on each occasion with one half of the quantities of caustic soda solution and chloride previously used. The whole is then stirred for 12 hours at 5° C., small quantities of insoluble residue are removed by filtration, and the condensation product is precipitated from the filtrate by the addition of 150 parts by volume of concentrated hydrochloric acid. The whole is stirred for 1 hour at room temperature, and the precipitate is separated by filtration and washed with water. After drying, 270-280 parts of para-nitrobenzoyl-acetoacetic acid ortho-chloranilide are obtained in the form of a yellow brown powder. By using in this example, instead of the para-nitrobenzoyl chloride, the same quantity of meta-nitrobenzoyl chloride, meta-nitrobenzoyl-acetoacetic acid-ortho-chloranilide is obtained in good yield.

*Example 6*

237 parts of acetoacetic acid-(2:5-dimethoxy)-anilide are condensed in the manner described in Example 4 with para-chlorbenzoyl chloride. The para-chlorobenzoyl derivative of the formula

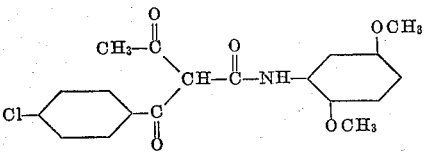

is obtained in good yield in the form of a white crystalline powder.

*Example 7*

211.5 parts of acetoacetic acid ortho-chloranilide are condensed in the manner described in Example 5 with 166.5 parts of cinnamic acid chloride dissolved in 200 parts of dioxane. The condensation product is obtained in good yield in the form of a yellow crystalline powder. Instead of dioxane acetone may be used as the solvent for the acid chloride.

*Example 8*

211.5 parts of acetoacetic acid ortho-chloranilide are dissolved in 1000 parts by volume of dry chlorobenzene. At the same time a solution of 36 parts of metallic sodium in 800 parts of absolute alcohol and a solution of 215.5 parts of 3-nitro-4-methoxy-benzoyl chloride in 300 parts of chlorobenzene are prepared. One half of the sodium alcoholate solution is run in while imparting a thorough whirling movement to the whole, which is then cooled to 0-5° C. and into which one half of the chloride solution is introduced in the course of about 30 minutes. The whole is then stirred for 2-3 hours until the sodium salt of the condensation product is separated in the form of a yellow crystalline salt. The remaining half of the alcoholate solution is run in and then the remaining half of the chloride solution is introduced in the course of 30 minutes. This procedure is continued until practically the whole of the solutions have been consumed. The whole is then stirred for a further 12 hours at 5° C. and the precipitate is separated by filtering with suction.

The salt mixture is dissolved in 1000 parts of water, adherent chlorobenzene is removed by means of steam under reduced pressure at 30-40° C., the solution which remains behind is filtered, and the condensation product is precipitated by the addition of 150 parts by volume of concentrated hydrochloric acid. The whole is stirred for 1 hour, filtered, and the filter residue washed with water. After drying under reduced pressure there are obtained in this manner 300 parts of 3-nitro-4-methoxy-benzoyl-acetoacetic acid ortho-chloranilide in the form of a yellow-brown crystalline powder.

By using in this example, instead of the acetoacetic acid ortho-chloranilide, a corresponding quantity of acetoacetic acid anilide, 3-nitro-4-methoxy-benzoyl-acetoacetic acid anilide is obtained in good yield.

*Example 9*

109 parts of acetoacetic acid ortho-chloranilide (a product containing 97.3 per cent. of the pure substance) are dissolved in 400 parts of water and 50 parts by volume of caustic soda solution of 30 per cent. strength at 45–50° C. All the constituents remain in solution when cooled to 0° C. 25.5 parts of finely triturated terephthaloyl chloride are introduced in the course of ¾–1 hour at −5° C. to 0° C. while thoroughly stirring. A yellow precipitate is formed immediately which continues to become thicker as time elapses. The whole is further stirred for 24 hours at −5° C. to 0° C., the temperature is then allowed to increase to about 20° C., and the whole is filtered with suction and the filter residue is washed with distilled water. The residue contains the regenerated acetoacetic acid ortho-chloranilide. The yellow solution is rendered acid to Congo in the cold with about 50 parts by volume of hydrochloric acid of 30 per cent. strength to form a precipitate, and the precipitate is separated by filtering with suction, washed until neutral to Congo with distilled water, and dried at 90–95° C. under reduced pressure on the water bath. About 64 parts of terephthaloyl-bis-(acetoacetic acid ortho-chloranilide) are obtained in the form of a beige coloured powder.

*Example 10*

136 parts of acetoacetic acid-2:4-dimethoxy-5-chloranilide are stirred in 800 parts of water and 50 parts by volume of caustic soda solution of 30 per cent. strength. The whole is then cooled to 0° C. without the whole of the starting material having dissolved, and the latter is then treated with terephthaloyl chloride as described in the preceding example.

The condensation of acetoacetic acid-2:5-dimethoxy-4-chloranilide and acetoacetic acid 4-chloro-6-methoxy-3-methylanilide are carried out in the same manner. In this manner there are obtained the corresponding terephthaloyl-bis-(acetoacetic acid anilides) having the above named substituents in the anilide residue.

In the above examples sodium has always been used as alkali metal in view of the comparatively low price of sodium and its compounds in comparison with potassium and other alkali metals and their compounds. However, it is to be understood that the invention is not restricted to the use of sodium as alkali metal.

What I claim is:

1. In a process for preparing acyl derivatives of amides of acetoacetic acid, the step which comprises reacting two molecular proportions of a compound of the general formula

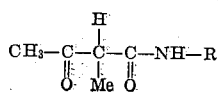

wherein Me stands for an alkali metal and R stands for a benzene radical containing at the most three substituents selected from the group consisting of halogen atoms, lower alkyl and lower alkoxy groups, with one molecular proportion of an aromatic carboxylic acid chloride.

2. In a process for preparing acyl derivatives of amides of acetoacetic acid, the step which comprises reacting two molecular proportions of a compound of the general formula

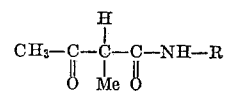

wherein Me stands for an alkali metal and R stands for a benzene radical containing at the most three substituents selected from the group consisting of halogen atoms, lower alkyl and lower alkoxy groups, with one molecular proportion of benzoyl chloride.

3. In a process for preparing acyl derivatives of amides of acetoacetic acid, the step which comprises reacting two molecular proportions of a compound of the general formula

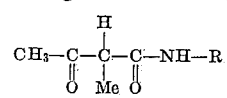

wherein Me stands for an alkali metal and R stands for a benzene radical containing at the most three substituents selected from the group consisting of halogen atoms, lower alkyl and lower alkoxy groups, with one molecular proportion of para-chloro-benzoyl chloride.

4. In a process for preparing acyl derivatives of amides of acetoacetic acid, the step which comprises reacting two molecular proportions of a compound of the general formula

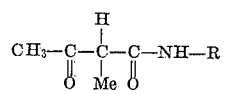

wherein Me stands for an alkali metal and R stands for a benzene radical containing at the most three substituents selected from the group consisting of halogen atoms, lower alkyl and lower alkoxy groups, with one molecular proportion of terephthaloyl chloride.

5. In a process for preparing acyl derivatives of amides of acetoacetic acid, the step which comprises reacting two molecular proportions of a compound of the general formula

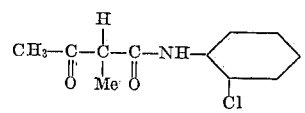

wherein Me stands for an alkali metal, with one molecular proportion of para chloro benzoyl chloride.

6. In a process for preparing acyl derivatives of amides of acetoacetic acid, the step which comprises reacting two molecular proportions of a compound of the general formula

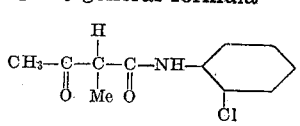

wherein Me stands for an alkali metal, with one molecular proportion of benzoyl chloride.

MAX SCHMID.

(References on following page)

REFERENCES CITED

The following references are of record in the file of this patent:

UNITED STATES PATENTS

| Number | Name | Date |
|---|---|---|
| 1,971,409 | Henle et al. | Aug. 28, 1934 |
| 2,432,499 | Boese | Dec. 16, 1947 |
| 2,436,130 | Weissberger et al. | Feb. 17, 1948 |

OTHER REFERENCES

Dieckmann et al.: "Ber. deut. Chem. vol. 37 (1904), pp. 4628 to 4637.

Berend et al.: "J. Prakt Chem. vol. 74, Series 2 (1906), pp. 124–126.

Shriner et l.: "J. Am. Chem. Soc. vol. 51 (1929), pp. 3636–3638.

Weygand: "Organic Preparations" (1945), pp. 359 to 365.